April 15, 1952  J. E. LUNDBERG ET AL  2,592,582
TORQUE MOTOR FOR GYROSCOPES
Filed April 17, 1950  4 Sheets-Sheet 1
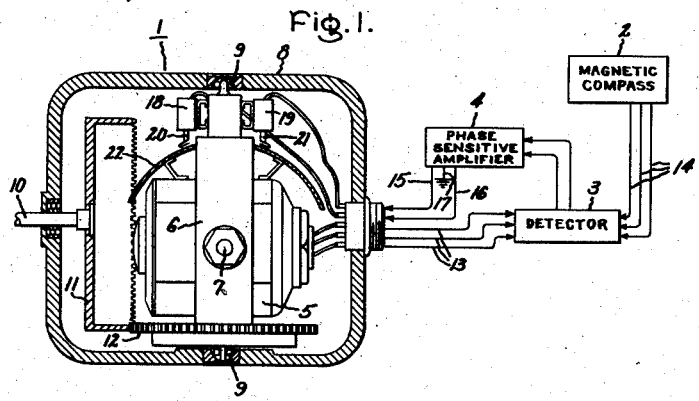
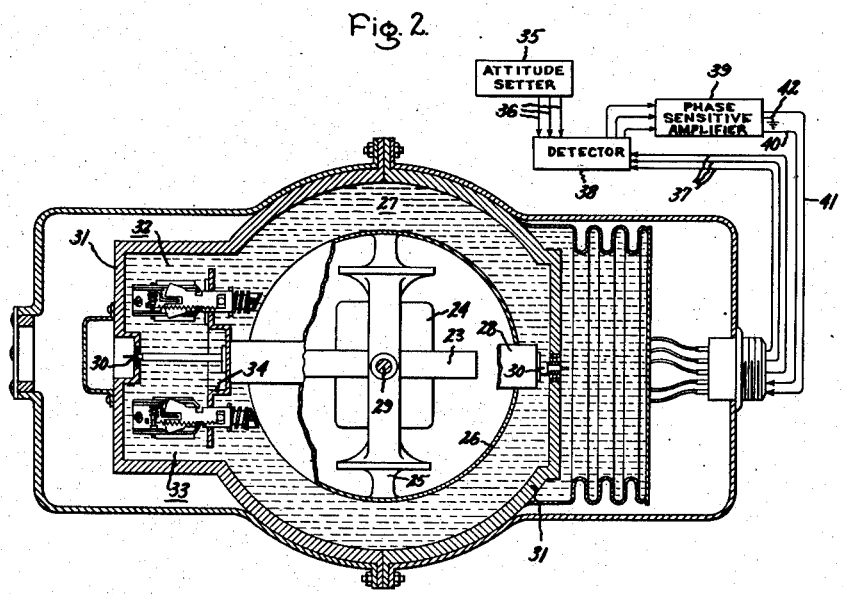
Inventors:
Harry G. Swanson,
John E. Lundberg,
by Russell A. Warner
Their Attorney.

April 15, 1952   J. E. LUNDBERG ET AL   2,592,582
TORQUE MOTOR FOR GYROSCOPES
Filed April 17, 1950   4 Sheets-Sheet 2
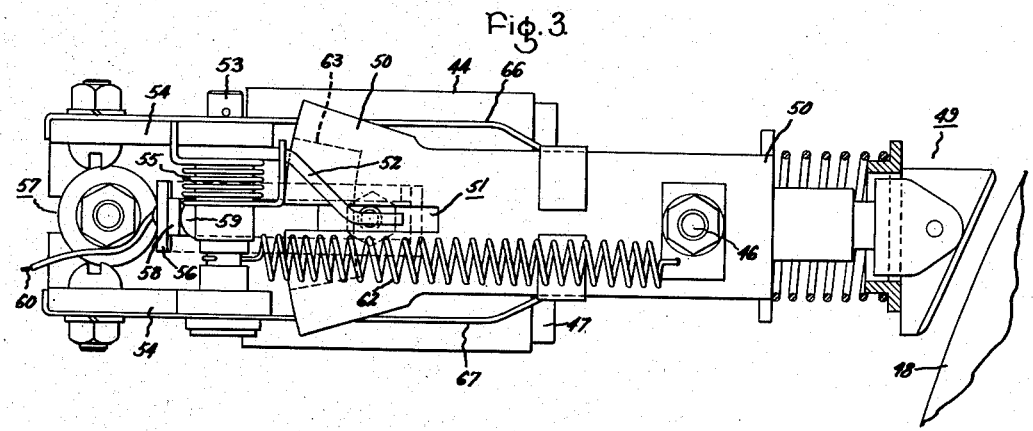
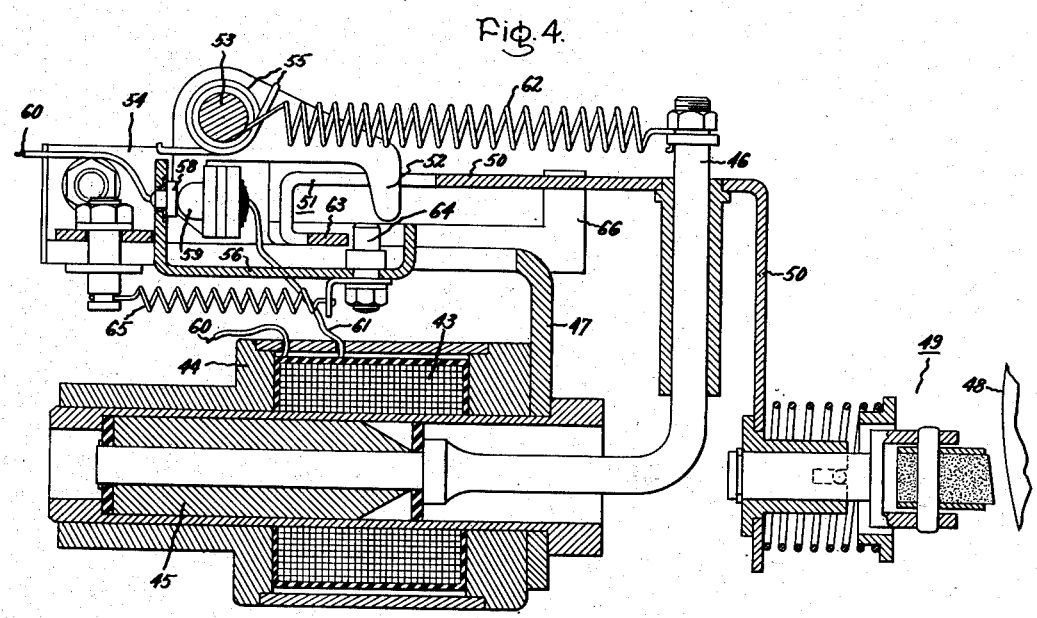
Inventors:
Harry G. Swanson,
John E. Lundberg,
by Russell A. Warner
Their Attorney.

April 15, 1952  J. E. LUNDBERG ET AL  2,592,582
TORQUE MOTOR FOR GYROSCOPES

Filed April 17, 1950  4 Sheets-Sheet 3

Inventors:
Harry G. Swanson,
John E. Lundberg,
by Russell A. Warner
Their Attorney.

April 15, 1952   J. E. LUNDBERG ET AL   2,592,582
TORQUE MOTOR FOR GYROSCOPES

Filed April 17, 1950   4 Sheets-Sheet 4

Inventors:
Harry G. Swanson,
John E. Lundberg,
by Russell A. Warner
Their Attorney.

Patented Apr. 15, 1952

2,592,582

UNITED STATES PATENT OFFICE 2,592,582

TORQUE MOTOR FOR GYROSCOPES

John E. Lundberg, Swampscott, and Harry G. Swanson, Belmont, Mass., assignors to General Electric Company, a corporation of New York Application April 17, 1950, Serial No. 156,304

18 Claims. (Cl. 74—5.41)

The present invention relates to torque exerting means and, more particularly, to improved torque exerting arrangements for precessing gyroscopic instruments to desired attitudes.

Lack of correspondence between the orientation of the rotor structure of a gyroscopic instrument and the attitude which this structure should assume for satisfactory operation occasions the use of torque exerting devices having varied constructions and producing numerous different and characteristic attitude changes. Those acquainted with the gyro art appreciate, for example, that the departures from the vertical of the rotor spin axis of a horizon type instrument, and the deviations of a directional gyro spin axis from the azimuth heading of a magnetic compass to which it is slaved, and the errors in the orientations of the spin axis of a free gyroscope, may be corrected by the application of torques to the rotor structures in the appropriate senses to create precession properly aligning these structures. In many conventional torque applying arrangements designed for such corrections, particularly those employed with directional instruments, magnetic devices are utilized to produce the required torques, and the residual magnetism and fields from the magnetic elements thereof may create undesired torques and erroneous gyro attitudes when the torque motors are not energized. Further, the remoteness of gyroscopic devices from the instrument panels of modern aircraft dictates that the torque exerting arrangements therefor should be sufficiently automatic to perform complete precessing operations in response to remotely transmitted actuating signals and should accomplish these operations within intervals shorter than those realized hitherto with known torque motors.

In accordance with the present invention, rapid precession of a gyroscope to desired attitudes is accomplished by a torque exerting system inclusive of electrically actuated members which directly apply forces between the inner and main gyro gimbal structures or between the outer gimbal and main gyro gimbal. As will be described in detail hereinafter with reference to preferred embodiments, it may be desirable, for example, that two such members be employed and that these comprise solenoids and plungers affixed to the main gimbal on opposite sides of the inner gimbal trunnion axis or affixed to the outer gimbal on opposite sides of the main gimbal trunnion axis, whereby the plungers cause rotor spin axis precession in opposite directions when actuated to extend into pressure contact with the inner gimbal or rotor structure. Precession forces are applied in such a manner that the torque exerting members do not introduce forces in directions other than those required to accomplish the desired attitude change, and do not detrimentally interfere with the operation of the gyroscope should maneuvering be performed during the precessing interval.

It is therefore one object of the present invention to provide improved gyroscope systems wherein precessing of gyroscopes with increased rapidity and accuracy may be accomplished by remote control.

Further, it is an object to provide gyro torque motor arrangements which eliminate drag on the movable gyro structures when these arrangements are not excited.

An additional object is to provide a gyro precessing device which, under continuous excitation, may repeatedly apply direct torques between the inner and main gimbals or between the outer and main gimbals of a gyroscope.

Still further, it is an object to provide solenoid torque motors, for precessing gyroscopes, wherein the solenoid plungers thereof are repeatedly actuated and introduce no undesired torques between the gyro gimbals.

These and other objects and features of this invention may be most effectively observed with reference to the following description and the accompanying drawings, wherein:

Figure 1 depicts, partially in schematic and partially in sectionalized pictorial form, a compass-controlled directional gyroscope system including a rapid precessing arrangement in accordance with this invention;

Figure 2 is a partially cut away pictorial view of a floated type gyroscopic instrument incorporating solenoid precessing devices and a remote precessing system;

Figure 5:
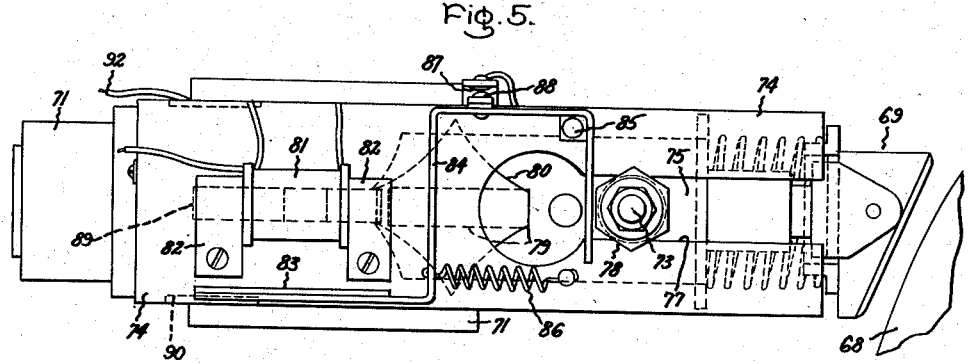
Figure 6:
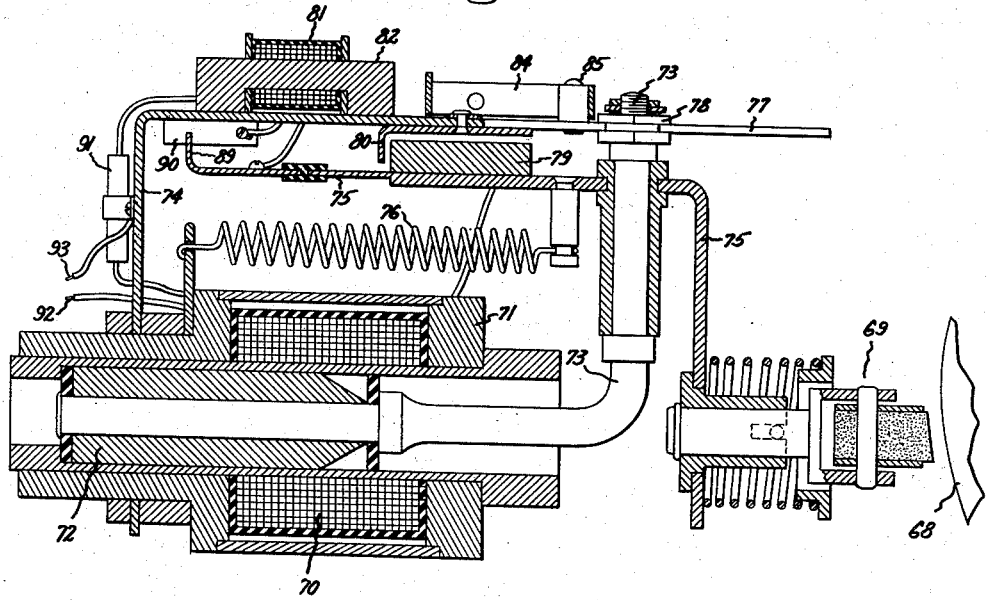
Figure 7:
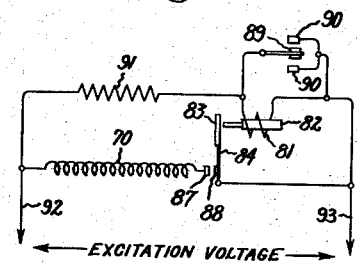
Figure 8:
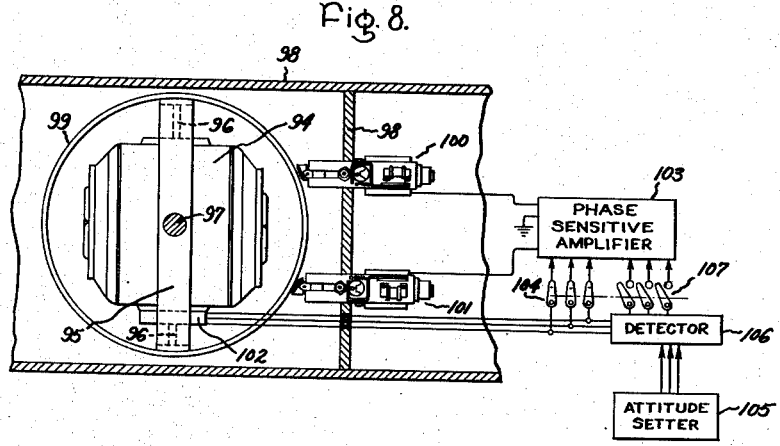

Figures 3 and 4 comprise a plan and partially sectionalized side view, respectively, of one preferred embodiment of a solenoid torque motor arrangement;

Figures 5 and 6 are a plan and partially sectionalized side view, respectively, of another preferred embodiment of a solenoid torque motor arrangement;

Figure 7 is a schematic diagram of the electrical circuit of the torque motor of Figures 5 and 6; and Figure 8 is a partially cut away pictorial view of a gyro instrument wherein precessing is accomplished by the application of torques, in accordance with this invention, between the outer and main gyro gimbals.

The compass-controlled directional gyroscope system illustrated in Figure 1 includes, conventionally, a directional gyroscope 1, magnetic compass 2, detector 3, and phase-sensitive rectifier-amplifier 4. The directional gyro unit 1 comprises a gyro rotor bearing structure or inner gimbal 5, housing a gyro rotor (not shown) which is driven to rotate about a normally horizontal spin axis, a main gimbal 6 on which frame 5 is pivotally mounted by means of trunnions 7 such that rotation of the rotor bearing structure about a minor axis perpendicular to the spin axis is permitted, an outer frame or gimbal 8 within which main gimbal 6 is pivotally mounted in bearings 9 for rotation about a vertical major gyro axis, and an output shaft 10 actuated by gimbal 6 through gears 11 and 12. A directional reference is obtained by the tendency of the gyro spin axis to maintain a predetermined orientation in space, as is well understood by those versed in the art, and it is essential to the preservation of desired azimuth indication accuracies that any deviations of the gyroscope spin axis from positions of correspondence with magnetic compass 2 be corrected. In accomplishing such corrections, electrical signals representative of the azimuth orientations of the compass and rotor bearing structure are applied to the detector selsyn 3, which detector produces an output voltage having a polarity indicative of the direction of departure from correspondence of the gyro and compass, this voltage being zero when correspondence obtains. The associated equipment necessary to deliver the gyro and magnetic compass signals to detector 3 through connections 13 and 14 has not been illustrated and may, obviously, comprise any of the known arrangements employed in this manner. Phase-sensitive rectifier-amplifier 4 is responsive to the polarity of the output of the detector 3 in its production of direct current outputs between leads 15 and 16 and the common or ground terminal 17. Thus, when the gyroscope deviates in one angular direction from the compass heading, the amplifier 4 produces a direct current output between lead 15 and terminal 17, and, when the deviation is in the opposite direction, the output appears between lead 16 and terminal 17. Torque motors 18 and 19, each electrically coupled between one of the leads 15 and 16 and ground terminal 17, are actuated by these direct current outputs from amplifier 4 to precess the gyroscope until correspondence with the compass is restored and the output signals from detector 3 and amplifier 4 are reduced to zero.

The improved torque motor and gyro arrangement to which the present invention relates incorporate the torque motors 18 and 19 which are solenoid devices having plungers 20 and 21, respectively. These solenoids are affixed to the main gimbal 6 and are arranged such that the plungers thereof may be extended, by energizing the associated solenoid coils from the output of amplifier 4, to contact the circularly-shaped cap or ring 22 of the rotor bearing structure 5 on opposite sides of the minor axis defined by trunnions 7. Torques exerted upon the rotor bearing structure about the minor gimbal axis cause rotation of this structure about an axis perpendicular to the minor axis. Hence, as long as either plunger 20 or 21 exerts a torque about the minor axis, the rotor structure and the supporting gimbal 6 are caused to rotate about the major gimbal axis and alter the gyro spin axis azimuth heading, the direction of such rotation depending upon which of the two solenoids is energized. In the system of Figure 1, the circuit is so established that the torque motors are actuated to precess the gyro into correspondence with the compass in precisely this fashion.

Particularly advantageous utilization of the precessing arrangements of this invention appears in their application to systems including floated gyroscopic instruments of the type disclosed in the copending application of F. V. Johnson and F. R. Fowler, Serial No. 171,582, filed July 1, 1950, for "Floated Gyroscopes," assigned to the same assignee as that of the present application. Figure 2 represents such an instrument wherein the rotor 23, rotor motive means 24, and support means 25 are mounted in a sealed spherical shell or container 26 of such proportions that it will just support itself within the liquid 27. Container or inner gimbal 26 is pivotally supported along a minor axis by main gimbal 28 through trunnions 29, and universal freedom of movement of the sphere is permitted by virtue of its pivoting about these trunnions 29 and by virtue of pivoting of gimbal 28 about a major axis on trunnions 30 supported by bearings in the liquid-tight enclosure of frame or outer gimbal 31. Since the volume intermediate the outer enclosure 31 and the elements internal thereto is completely filled by liquid 27, thus buoying both the sphere and gimbal, the loads on the trunnions are reduced to minute values and the accuracies of the attitudes which may be maintained are of extremely high values. However, the overall instrument accuracy would be reduced by precessing devices of conventional constructions which incorporate magnetic elements introducing drag torques even when inoperative. It is of definite advantage, therefore, to apply precessing torques to the floated gyroscope by torque motors such as 32 and 33 which are mounted on bracket 34, coupled for rotation with gimbal 28, for application of forces to the spherical container 26 on opposite sides of the minor gimbal axis defined by trunnions 29. Each of these torque motors, as will be disclosed more thoroughly hereinafter, comprises a solenoid coil, a normally-retracted plunger assembly which may be extended to forcefully contact the spherical container, and automatic switching means for interrupting the coil circuit before the plunger assembly can become sufficiently displaced, when extended, to exert undesired components of force upon the container, whereupon the plunger assembly is retracted and then re-extended. The attitude in correspondence with which the gyroscope is to be maintained is represented by the characteristic electrical signal output of an attitude setting device 35, which may be a magnetic compass or any suitable course or attitude setter, and the attitude which the gyroscope actually assumes is represented by characteristic electrical signals derived from pick-off equipment which may be of conventional design and which, in the interest of preserving simplicity of the drawing, has not been illustrated. Both of these signals are fed, by way of leads 36 and 37 respectively, to the detector selsyn 38 which, in turn, produces a signal output representative in polarity of the lack of correspondence between the attitude set and the actual gyro attitude. This signal output is delivered to the phase-sensitive rectifier-amplifier 39, the amplifier output being in the one of the two output circuits which includes that torque motor which must cause precession in the direction which more rapidly brings the gyroscope into correspondence with the set attitude. Amplifier output leads 40 and 41 couple the torque motors 32 and 33 to these output circuits appearing between leads 40 and 41 and the common or ground terminal 42.

It would appear that, since the torque motors are mounted on the main gimbal, the solenoid plunger assembly which is extended to contact the rotor bearing structure will, during precessing intervals, bear substantially the same orientation with respect to this structure that it had when initially excited to the extended position, and that, therefore, there should be no relative displacement and no drag torque therebetween. However, when the supporting craft maneuvers to assume different attitudes during this same precessing interval, the relative orientations of the main gimbal and rotor structure vary, and undesired torques between the plunger assembly and rotor structure may ensue. Further, slippage between the plunger assembly and rotor structure may occur because of the difficulty of securing non-slip contacts, and relative rotation between the rotor structure and gimbal about the minor axis may also be experienced as a result of the increased friction about the major axis when precession is produced. Preferred embodiments of torque motors in accordance with this invention are of such construction that the members which contact the rotor structure may be moved only to limited extents, both in extended and sideways directions, and, upon reaching these limits, are automatically and immediately withdrawn and re-extended to contact the rotor structure in proper alignment. In this manner, accurate precession is rapidly accomplished while avoiding the possibility of introducing torques which act to cause attitude changes other than those desired.

A torque motor arrangement which satisfies the foregoing operational requirements appears in plan view in Figure 3 and in a longitudinal cross-sectional view in Figure 4. The solenoid winding 43 is shown to be enclosed in a casing 44 which is designed to permit longitudinal movement of the solenoid plunger 45 and its shaft or extension 46. Bracket 47 is affixed to casing 44 and serves to support and guide the members which move upon the extending and retracting of the plunger shaft. Precession or other movement of the member 48 is accomplished by the frictional contacting structure 49 which is carried by the arm 50 pivotally supported by the plunger extension 46. It should be observed that the portion of arm 50 near the end opposite the frictional contacting structure 49 is provided with a longitudinal slot 51 and that an end of finger member 52, pivotally supported by shaft 53 mounted in the upwardly-extending sides 54 of bracket 47, is urged into this slot by the helically-wound spring 55 on shaft 53. The alignment of arm 50 with bracket 47 provided by the positioning of finger member 52 in slot 51 maintains a desired longitudinal motion of contacting structure 49 upon actuation of the solenoid winding 43 and the consequent extending of arm 50. A switch bracket 56 is associated with bracket 47 and is slidable longitudinally with respect thereto by virtue of the positioning of the switch bracket by the longitudinal slot 57 in support and guide bracket 47. The portions of switch bracket 56 which are on opposite sides of the slot in bracket 47 are preferably of widths greater than that of slot 57, whereby only sliding relative movements between these brackets obtain. Electrical switching contacts 58 and 59, secured to switch bracket 56 and finger member 52 respectively, are serially interposed between the excitation leads 60 and the solenoid winding 43.

Figures 3 and 4 depict the torque motor elements as oriented in the unexcited or de-energized state. When electrical energy is applied to the torque motor, current flows through leads 60, closed contacts 58 and 59, lead 61, and solenoid winding 43, whereupon plunger 45 and its attached shaft 46 are forced to the right, carrying the contact structure 49 and arm 50 in this direction against the restraining spring 62 which is connected between shaft 46 and some part affixed to bracket 47, such as shaft 53. For a predetermined distance of the extended movement of arm 50, the motion thereof must be parallel to that of plunger 45, due to the positioning of finger member 52 in slot 51. However, as arm 50 is extended, the lower lip 63 thereof is moved against the pin 64 projecting through slot 57 from the switch bracket 56 to which it is attached, and bracket 56 is moved simultaneously in the same direction, against the force of the restraining spring 65 connected between bracket 56 and bracket 47. Movement of bracket 56 forces contact 58 thereon to press against contact 59, thus rotating this latter contact and its supporting finger member 52 counterclockwise against the force of the restraining spring 55, but maintaining the electrical supply to solenoid winding 43. Finger 52 is thus removed from slot 51 prior to the engagement between the contacting structure 49 and the contacted member 48, and, following such engagement, the arm 50 may be swiveled about the plunger shaft 46 in the absence of restraint by finger member 52.

If the contacted member 48 is a part of a gyro rotor structure which moves relative to the gimbal supporting it and the torque motor, as during maneuvers when precession by the torque motor is performed, structure 49 and its supporting arm 50 may be rotated through some angle about the axis of plunger shaft 46. The permissible angular rotation of arm 50 is half of the angle measured between the sides of lip 63 and the center of plunger shaft 46, and, when this angular travel is exceeded, lip 63 no longer bears against pin 64, switch bracket 56 is returned to the position illustrated, by spring 65, contacts 58 and 59 are opened and remain so due to the resting of finger member 52 on the upper surface of arm 50, solenoid winding 43 is deenergized, arm 50 and plunger 45 are returned to their retracted positions by spring 62, arm 50 is centralized parallel with plunger 45 by the two cantilever springs 66 and 67 affixed to bracket 47, finger member 52 is next forced into slot 51 by spring 55, and contacts 58 and 59 are again closed. Should excitation remain across leads 60 at such time, the entire extending cycle described above is repeated, and likewise the retracting cycle if lateral movement of arm 50 is experienced. When excitation ceases at any instant, as when precession to the desired attitude has been accomplished, the torque motor immediately assumes the retracted position wherein it has no effect upon the assembly to which it is designed to apply torque.

A second preferred embodiment of a torque motor in accord with the teachings of the present invention appears in plan and longitudinal cross-sectional views in Figures 5 and 6 respectively. This torque motor is of advantage in that the sideward component of forces applied to the contacted member 68 by the contacting structure 69 is of negligible value and the return spring forces may be minimized to increase the useful component of torque which may be obtained with a particular size of solenoid. The solenoid winding 70 is shown to be contained within a casing 71 which is designed to permit longitudinal movement of the solenoid plunger 72 and its shaft or extension 73. Bracket 74 is affixed to casing 71 and serves to support the members which control the extending and retracting movements of the plunger shaft. A bracket 75 supports the frictional contacting structure 69 and is itself pivotally mounted on the longitudinally movable shaft 73, the spring 76 connected between extensions of bracket 75 and casing 71 serving to retain the plunger and bracket in the illustrated position when the solenoid winding is de-energized. Bracket 74 is provided with a longitudinal slot 77 in which the guide member 78, attached to plunger shaft 73, can move, thus eliminating any possibility of the rotation of the plunger shaft 73 about the longitudinal axis of the solenoid 70 and plunger 72. Affixed to the top of movable bracket 75 is a magnet 79, and, mounted on the under side of bracket 74 and in close proximity with this magnet, is a member 80 of ferromagnetic material shaped as shown in the view of Figure 5. The shape of member 80 is selected such that magnet 79 tends to centralize itself to the position illustrated when bracket 75 is rotated through some angle about shaft 73, and, such centralizing force is nearly constant for any displacement angle rather than a function of this angle, as would be the case if a conventional spring were employed. Also attached to bracket 74 is an assembly consisting of an electromagnet coil 81 and a core 82. This assembly cooperates with the armature 83 affixed to arm 84 pivoted on bracket 74 by means of stud 85. Arm 84 is retained in the position shown by plunger shaft guide 78 against the force of the compression spring 86 when the torque motor is in the retracted state. Electrical contacts 87 and 88 are supported by bracket 74 and arm 84 respectively, and additional electrical contacts are provided by end 89 of bracket 75 and the contacting members 90 mounted on bracket 74.

Operation of the torque motor of Figures 5 and 6 may be readily comprehended with additional reference to Figure 7 wherein the schematically portrayed circuit elements bear the same numerical designations as those pictorially represented in Figures 5 and 6. In the normal or retracted state of the motor, spring 76 holds the bracket 75 in the retracted orientation such that guide 78 maintains arm 84 in a position wherein contacts 87 and 88 are closed, and contacts 89 and 90 are open because of the centralizing of bracket 75 by magnet 79 and magnetic member 80. Hence, when excitation voltage is maintained across leads 92 and 93, solenoid winding 70 is energized through contacts 87 and 88 and plunger 72 moves to the right, carrying with it the bracket 75 and the contacting structure 69, parallel motions of the plunger and bracket 75 being preserved by the magnet 79 and co-operating magnetic member 80. Coil 81 is also energized, simultaneously, through resistance 91, and holds contacts 87 and 88 closed while guide 78 moves away from arm 84. If a pivoting movement of bracket 75 about shaft 73 is caused by changes in the relative orientations of contacted member 68 and contacting structure 69, contact 89 on bracket 75 moves until it touches one of contacts 90, whereupon coil 81 becomes shorted out of the circuit, arm 84 is pulled back by spring 86, contacts 87 and 88 are opened, winding 70 is de-energized, spring 76 pulls plunger 72 and bracket 75 to the retracted positions, magnet 79 centralizes bracket 75, and the torque motor is ready for another cycle if excitation voltage remains across the leads 92 and 93. Thus, this torque motor may have the contacting structure thereof turned through a predetermined angle with very little restraining torque, and the solenoid may be de-energized without introducing large lateral components of force which obtain with other switch arrangements.

A gyro instrument wherein precession is accomplished about the minor gimbal axis by the disclosed torque motor arrangement is depicted in Figure 8. The gyroscope unit comprises the inner gimbal or rotor structure 94, within which is contained the gyro rotor and motive means therefor (not shown) pivotally mounted in main gimbal 95 along the minor axis defined by trunnions 96, the main gimbal 95 being pivotally mounted, about the major axis defined by trunnions 97, in the outer casing 98 which also serves as the outer gyro gimbal. Main gimbal 95 is provided with a circular ring 99 which is substantially coaxial with the major axis of the gyro, and torque motors 100 and 101 are mounted on the outer gimbal or casing 98 in positions enabling these torque exerting devices to exert torques on this ring in opposite directions about the major axis irrespective of the attitude of the gyro spin axis and the main gimbal. It is of course apparent to those skilled in the art that a gyro rotor spin axis will be precessed about the minor gyro axis when forces are applied to the main gimbal structure out of line with the major gyro axis. Therefore, if the gyro of Figure 8 is a directional instrument whose spin axis is to be kept level by being maintained at right angles with the major gyro axis, the electrical pickoff 102, producing signals indicative of the displacement between the inner and outer gimbals 94 and 95, may be employed to actuate a phase sensitive amplifier 103, through switch contacts 104, which controls the energizing of torque motors 100 and 101. Any deviation of the gyro spin axis from the predetermined orientation is characterized by the pickoff signals, and amplifier 103 responds thereto by actuating that torque motor which causes precession of rotor structure 94 in a direction which permits the more rapid return to the attitude at which zero pickoff output obtains. If the spin axis is to be maintained at an attitude determined by an attitude setting device 105, in either a horizon or direction instrument, the amplifier 103 may be responsive to the output of a detector 106 which delivers an output, over contacts 107, which is characteristic of the deviations between the attitudes of the setting device and spin axis as represented by the signal outputs from the attitude setter 105 and pickoff 102.

It should be apparent that the present invention is susceptible of modification in numerous ways without departure from the spirit or scope thereof. By way of illustration, it is contemplated that the torque motor arrangements herein disclosed be applied to horizon as well as directional instruments for application of precessing torques about either or both of the inner and main gimbals of a gyroscope. Although the drawings represent the torque motors as mounted on the outer of the two gimbals between which forces are applied, the arrangement may obviously be reversed with comparable results, that is, the torque motors may be mounted on the inner gimbal or rotor structure and extend to contact the main gimbal or some attachment thereto, or the torque motors may be mounted on the main gimbal and extend to contact the instrument casing or outer gimbal structure. And while the prime advantages of this invention are to be realized when torques are applied to a gyro instrument, it may also be advantageous in certain applications that a torque motor in accord with this invention be employed to apply forces to other devices, as, for example, a timer wherein a rotatable member is to be rotated automatically in steps of predetermined angular movements. The switching and other torque motor mechanisms shown and described may obviously be modified or changed without recourse to the inventive faculties and within the scope of the invention as claimed. The contacting structure which is extended to make physical connection with the members to which forces are applied is preferably constructed such that no slippage will occur upon contact, and the contact may be either firm or resilient depending upon the particular requirements.

While particular embodiments of the subject invention have been shown and described herein, these are in the nature of description rather than limitation, and it will occur to those skilled in the art that various changes, modifications, and combinations may be made within the province of the appended claims and without departing either in spirit or scope from this invention in its broader aspects.

What we claim as new and desire to secure by Letters Patent of the United States is:

1. A torque actuated system comprising a movable structure, an electrical energy source, a torque exerting device having a member which extends to apply forces directly to said structure responsive to signals from said source, means coupling energy from said source to said device when said member is retracted, means for interrupting said coupling by said coupling means to cause de-energizing said device when said member moves beyond predetermined limits of travel, and means for retaining said member in a retracted position upon de-energizing of said device.

2. A torque actuated system comprising two relatively movable structures, an electrical energy source, a device mounted on one of said structures for exerting torques on the other of said structures responsive to signals from said source, said device having a member which extends to contact and apply forces directly to said other structure, means for coupling energy from said source to said device when said member is out of contact with said other structure, means for interrupting said coupling by said coupling means to cause de-energizing said device when said member moves beyond predetermined limits, and means for maintaining said member out of contact with said other structure when said device is de-energized.

3. In a torque actuated system wherein forces are applied between two relatively movable structures, the torque exerting device mounted on one of said structures comprising an electrical winding, a member movable into contact with the other of said structures responsive to the energizing of said winding, resilient means forcing said member out of contact with said other structure, and switching means for de-energizing said winding when said member exceeds predetermined limits of movement and for maintaining said winding energized when said member is out of contact with said other structure, whereby said member is repeatedly moved into contact with said other structure when said member moves beyond said limits when contacting said other structure.

4. In a torque actuated system wherein forces are applied between two relatively movable structures, the torque exerting device mounted on one of said structures comprising a bracket member, an electrical winding mounted on said member, a member movable into contact with the other of said structures responsive to the energizing of said winding, resilient means connected between said bracket and movable members forcing said movable member out of contact with said other structure, guide means mounted on said bracket for directing the movement of said movable member into contact with said other structure, and switching means for de-energizing said winding, when said movable member exceeds predetermined limits of movement, until said movable member is out of contact with said other structure.

5. An arrangement for exerting torques between relatively movable structures, comprising a mounting bracket affixed to one of said structures, a solenoid winding supported by said bracket, a solenoid plunger positioned for actuation by said winding, a contacting member pivotally mounted on said plunger for actuation therewith to a position of contact with the other of said structures, resilient means coupled with said bracket and plunger for forcing said plunger to a position wherein said contacting member is out of contact with said other structure, and switching means mounted on said bracket for de-energizing said solenoid winding, when said contacting member exceeds predetermined limits of pivotal movement, until said contacting member is out of contact with said other structure.

6. An arrangement for exerting torques between relatively movable structures, comprising a mounting bracket affixed to one of said structures, a solenoid winding supported by said bracket, a solenoid plunger positioned for actuation by said winding, a contacting arm pivotally mounted on said plunger and having a contacting structure on one end thereof for applying forces to the other of said relatively movable structures, said arm having a longitudinal slot therein, resilient means coupled between said plunger and said bracket for forcing said plunger and arm to a position wherein said contacting structure is out of contact with said other structure, a switch bracket slidably mounted on said mounting bracket, an electrical contact supported by said switch bracket, resilient means coupled between said brackets urging said switch bracket to a predetermined position, a member rotatably mounted on said mounting bracket and having an end adapted to engage said slot, resilient means rotatably urging said member into said slot, an electrical contact on said member means serially coupling said contacts and winding to a power source, and a projection from each of said bracket and said arm, said projections being disposed for engagement such that movement of said arm responsive to excitation of said winding slides said switch bracket, said contacts being disposed for engagement, whereby said sliding of said switch bracket forces said member contact to pivot said member out of engagement with said slot, said projections being dimensioned such that pivotal movement of said arm about said plunger in excess of predetermined limits results in disengagement of said projections, return of said switch bracket to said predetermined position, and separation of said contacts.

7. An arrangement for exerting torques between relatively movable structures, comprising a mounting bracket affixed to one of said structures, a solenoid winding supported by said bracket, a solenoid plunger positioned for actuation by said winding, said bracket having a guide slot therein which engages and guides the movement of said plunger, a contacting arm pivotally mounted on said plunger and having a contacting structure on one end thereof for applying forces to the other of said relatively movable structures, resilient means coupled between said plunger and bracket for forcing said plunger and arm to a position wherein said contacting structure is out of contact with said other structure, means coupled with said arm and said bracket tending to maintain said arm in a predetermined relationship with said bracket, first electrical contacts attached to said arm and said bracket, said contacts engaging upon pivotal movement of said arm about said plunger in excess of predetermined limits, an electromagnet mounted on said bracket, an electromagnet armature pivotally mounted on said bracket, second electrical contacts mounted on said armature and on said bracket, said second contacts engaging when said electromagnet is energized, means for coupling said winding and second contacts serially with a power source, and means for coupling said electromagnet and first contacts in parallel with said power source.

8. An arrangement for exerting torques between relatively movable structures, comprising a mounting bracket affixed to one of said structures, a solenoid winding supported by said bracket, a solenoid plunger positioned for actuation by said winding, a contacting member pivotally mounted on said plunger for actuation therewith to a position of contact with the other of said structures, resilient means coupled with said bracket and plunger for forcing said plunger to a position wherein said contacting member is out of contact with said other structure, a permanent magnet, a ferromagnetic member, said magnet and ferromagnetic member being affixed one to said bracket and the other to said contacting member and being positioned for magnetic interaction to align said bracket and contacting member in a predetermined relationship, said ferromagnetic member and magnet being dimensioned such that the force tending to produce said alignment is substantially the same for all displacements therebetween, and switching means mounted on said bracket for de-energizing said solenoid winding when said contacting member exceeds predetermined limits of pivotal movement.

9. In a torque actuated gyroscope system including an inner gimbal structure, a gyro rotor and motive means therefor supported by said inner gimbal structure, a main gimbal structure pivotally supporting said inner gimbal structure about a minor axis, and an outer gimbal structure pivotally supporting said main gimbal structure about a major axis, the precessing arrangement comprising an electrical energy source, a torque motor device mounted on one of said gimbal structures for exerting forces on another of said gimbal structures responsive to signals from said source, said device having a member which may be extended to contact and apply forces directly to said other gimbal structure about one of said axes, means for coupling energy from said source to said device when said member is out of contact with said other gimbal structure, means for interrupting said coupling by said coupling means to cause de-energizing said device when said member moves beyond predetermined limits, and means for maintaining said member out of contact with said other gimbal structure when said device is de-energized.

10. In a torque actuated gyroscope system including an inner gimbal structure, a gyro rotor and motive means therefor supported by said inner gimbal structure, a main gimbal structure pivotally supporting said inner gimbal structure about a minor axis, and an outer gimbal structure pivotally supporting said main gimbal structure about a major axis, the precessing arrangement comprising an electrical energy source, two torque motor devices mounted on one of said gimbal structures for exerting forces on another of said gimbal structures responsive to signals from said source, each of said devices having a member which may be extended to contact and apply forces directly to said other gimbal structure, said members being positioned to apply said forces about one of said axes in directions producing torques in opposite directions about said one axis, means for coupling energy from said source to each of said devices when said member thereof is out of contact with said other gimbal structure, means for interrupting said coupling by said coupling means to cause de-energizing each of said devices when said member thereof moves beyond predetermined limits, and means for maintaining each of said members out of contact with said other gimbal structure when its device is de-energized.

11. In a torque actuated gyroscope system including an inner gimbal structure, a gyro rotor and motive means therefor supported by said inner gimbal structure, a main gimbal structure pivotally supporting said inner gimbal structure about a minor axis, and an outer gimbal structure pivotally supporting said main gimbal structure about a major axis, the precessing arrangement comprising an electrical energy source, two torque motor devices mounted on one of said inner and main gimbal structures for exerting forces on the other of said inner and main gimbal structures responsive to signals from said source, each of said devices having a member which may be extended to contact and apply forces directly to said other gimbal structure, said members being positioned to apply forces about said minor axis in directions producing torques in opposite directions about said minor axis, means for coupling energy from said source to each of said devices when the member thereof is out of contact with said other gimbal structure, means for interrupting said coupling by said coupling means to cause de-energizing each of said devices when said member thereof moves beyond predetermined limits, and means for maintaining each of said members out of contact with said other gimbal structure when its device is de-energized.

12. In a torque actuated gyroscope system including an inner gimbal structure, a gyro rotor and motive means therefor supported by said inner gimbal structure, a main gimbal structure pivotally supporting said inner gimbal structure about a minor axis, and an outer gimbal structure pivotally supporting said main gimbal structure about a major axis, the precessing arrangement comprising an electrical energy source, two torque motor devices mounted on one of said main and outer gimbal structures for exerting forces on the other of said main and outer gimbal structures responsive to signals from said source, each of said devices having a member which may be extended to contact and apply forces directly to said other gimbal structure, said members being positioned to apply forces about said major axis in directions producing torques in opposite directions about said major axis, means for coupling energy from said source to each of said devices when said member thereof is out of contact with said other gimbal structure, means for interrupting said coupling by said coupling means to cause de-energizing each of said devices when said member thereof moves beyond predetermined limits, and means for maintaining each of said members out of contact with said other gimbal structure when its device is de-energized.

13. In a torque actuated directional gyroscope system including an inner gimbal structure, a gyro rotor and motive means therefor supported by said inner gimbal structure, a main gimbal structure pivotally supporting said inner gimbal structure about a minor axis, and an outer gimbal structure pivotally supporting said main gimbal structure about a major axis, the precessing arrangement comprising two torque motor devices mounted on one of said main and inner gimbal structures for exerting forces on the other of said main and inner gimbal structures responsive to electrical signals, each of said devices having a member which may be extended to contact and apply forces directly to said other gimbal structure, said members being positioned to apply forces about said minor axis in directions producing torques in opposite directions about said minor axis, means for de-energizing each of said devices when said member thereof moves beyond predetermined limits, means for maintaining each of said members out of contact with said other gimbal structure when its device is de-energized, a compass unit producing output signals characteristic of compass headings, a pick-off coupled with said gyroscope producing output signals characteristic of the headings of said gyroscope, and means responsive to said pick-off and compass unit output signals for applying electrical signals to one of said devices when the deviation between said compass unit and gyroscope headings is in one direction and to the other of said devices when the deviation is in the opposite direction.

14. In a torque actuated gyroscope system for aircraft including an inner gimbal structure, a gyro rotor and motive means therefor supported by said inner gimbal structure, a main gimbal structure pivotally supporting said inner gimbal structure about a minor axis, and an outer gimbal structure pivotally supporting said main gimbal structure about a major axis, the precessing arrangement comprising two torque motor devices mounted on one of said gimbal structures for exerting forces on another of said gimbal structures responsive to electrical signals, each of said devices having a member which may be extended to contact and apply forces directly to said other gimbal structure, said members being positioned to apply said forces about one of said axes in directions producing torques in opposite directions about said one axis, means for de-energizing each of said devices when said member thereof moves beyond predetermined limits, means for maintaining each of said members out of contact with said other gimbal structure when its device is de-energized, an attitude setter producing output signals characteristic of desired gyroscope attitudes, a pick-off coupled with said gyroscope producing output signals characteristic of the attitudes of said gyroscope, and means responsive to said pick-off and setter output signals for applying electrical signals to one of said devices when the deviation between said setter and gyroscope attitudes is in one direction and to the other of said devices when the deviation is in the opposite direction.

15. In the torque actuated gyroscope system as set forth in claim 14, the precessing arrangement wherein each of said torque motor devices comprises a mounting bracket affixed to said one gimbal structure, a solenoid winding supported by said bracket, and a solenoid plunger positioned for actuation by said winding; wherein said member is pivotally mounted on said plunger and has a contacting structure on one end thereof for applying forces to said other gimbal structure, and said member has a longitudinal slot therein; wherein said means for maintain said member out of contact comprises a restraining spring coupled between said member and said bracket; and wherein said means for de-energizing said device comprises a switch bracket slidably mounted on said mounting bracket, an electrical contact supported by said switch bracket, resilient means coupled between said brackets urging said switch bracket to a predetermined position, a member rotatably mounted on said mounting bracket and having an end adapted to engage said slot, resilient means rotatably urging said rotatably mounted member into said slot, an electrical contact on said rotatably mounted member, means serially coupling said contacts and winding to said electrical signal applying means, and a projection from each of said bracket and extending member, said projections being disposed for engagement such that movement of said member responsive to excitation of said winding slides said switch bracket, said contacts being disposed for engagement, whereby said sliding of said switch bracket forces said member contact to pivot said rotatably mounted member out of engagement with said slot, said projections being dimensioned such that pivotal movement of said extending member in excess of predetermined limits results in disengagement of said projections, return of said switch bracket to said predetermined position, and separation of said contacts.

16. In the torque actuated gyroscope system as set forth in claim 14, the precessing arrangement wherein each of said torque motor devices comprises a mounting bracket affixed to said one gimbal structure, a solenoid winding supported by said bracket, and a solenoid plunger positioned for actuation by said winding; wherein said member is pivotally mounted on said plunger and has a contacting structure on one end thereof for applying forces to said other gimbal structure, and said bracket has a guide slot therein which engages and guides the movement of said plunger; wherein said means for maintaining said member out of contact comprises a restraining spring coupled between said bracket and said member; wherein the movement of said member is guided by magnetic means coupled with said bracket and said member tending to maintain said bracket and member in a predetermined relationship; and wherein said means for de-energizing said device comprises first electrical contacts attached to said member and said bracket, said contacts engaging upon pivotal movement of said member about said plunger in excess of predetermined limits, an electromagnet mounted on said bracket, an electromagnet armature pivotally mounted on said bracket, second electrical contacts mounted on said armature and on said bracket, said second contacts engaging when said electromagnet is energized, means for coupling said winding and second contacts serially with said electrical signal applying means, and means for coupling said electromagnet and first contacts in parallel with said electrical signal applying means.

17. In a torque actuated gyroscope system including an inner gimbal structure, a gyro rotor and motive means therefor supported by said inner gimbal structure, a main gimbal structure pivotally supporting said inner gimbal structure about a minor axis, and an outer gimbal structure pivotally supporting said main gimbal structure about a major axis, the precessing arrangement comprising two torque motor devices mounted on one of said main and outer gimbal structures for exerting forces on the other of said main and outer gimbal structures responsive to electrical signals, each of said devices having a member which may be extended to contact and apply forces directly to said other gimbal structure, said members being positioned to apply forces about said major axis in directions producing torques in opposite directions about said major axis, means for de-energizing each of said devices when said member thereof moves beyond predetermined limits, means for maintaining each of said members out of contact with said other gimbal structure when its device is de-energized, pick-off means coupled with said gyroscope for producing output signals characteristic of the relationship between said inner and main gimbal structures, and means responsive to said pick-off signals for applying electrical signals to one of said devices when said structures deviate in one direction from a predetermined relationship and to the other of said devices when the deviation is in the opposite direction.

18. In a torque actuated gyroscope system including an inner gimbal structure, a gyro rotor and motive means therefor supported by said inner gimbal structure, a main gimbal structure pivotally supporting said inner gimbal structure about a minor axis, and an outer gimbal structure pivotally supporting said main gimbal structure about a major axis, the precessing arrangement comprising two torque motor devices mounted on one of said main and outer gimbal structures for exerting forces on the other of said main and outer gimbal structures responsive to electrical signals, each of said devices having a member which may be extended to contact and apply forces directly to said other gimbal structure, said members being positioned to apply forces about said major axis in directions producing torques in opposite directions about said major axis, means for de-energizing each of said devices when said member thereof moves beyond predetermined limits, means for maintaining each of said members out of contact with said other gimbal structure when its device is de-energized, pick-off means coupled with said gyroscope for producing output signals characteristic of the attitude of said inner gimbal structure, an attitude reference device for producing output signals characteristic of predetermined attitudes, and means responsive to said pick-off and reference device output signals for applying electrical signals to one of said devices when the deviation between said gyroscope and reference device attitudes is in one direction and to the other of said devices when the deviation is in the opposite direction.

JOHN E. LUNDBERG.
HARRY G. SWANSON.

REFERENCES CITED

The following references are of record in the file of this patent:

UNITED STATES PATENTS

| Number | Name | Date |
| --- | --- | --- |
| 1,655,800 | Schein | Jan. 10, 1928 |
| 1,763,806 | Methvin | June 17, 1930 |

FOREIGN PATENTS

| Number | Country | Date |
| --- | --- | --- |
| 5,821 of 1911 | Great Britain | Feb. 15, 1912 |